July 1, 1930.  J. H. D. BEAUCAGE  1,768,971
STEAM AND HOT WATER HEATING APPARATUS
Filed Oct. 21, 1927
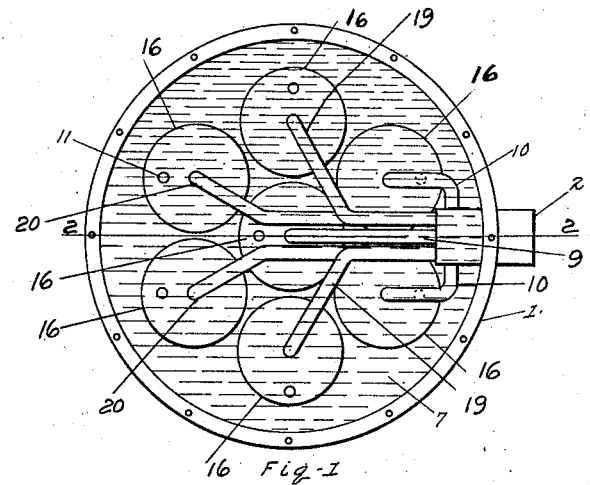
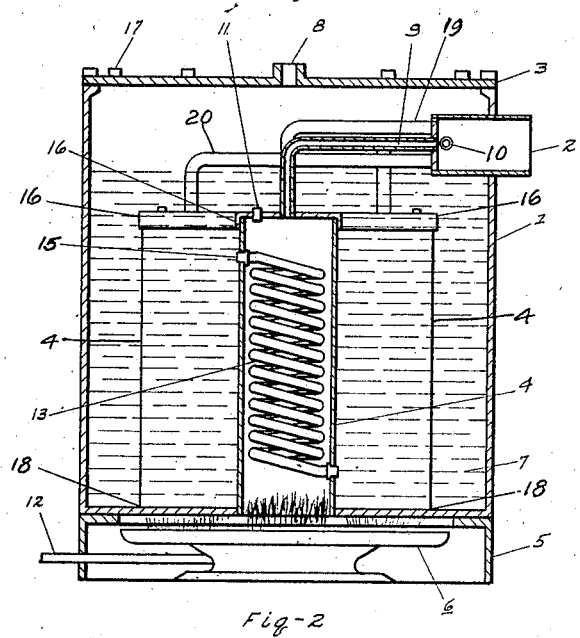
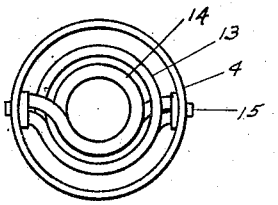
INVENTOR
JOSEPH H. D. BEAUCAGE
BY
*Oscar O. DeWitt*
ATTORNEY Patented July 1, 1930

1,768,971

UNITED STATES PATENT OFFICE

JOSEPH H. D. BEAUCAGE, OF PITTSFIELD, MASSACHUSETTS

STEAM AND HOT-WATER HEATING APPARATUS

Application filed October 21, 1927. Serial No. 227,836.

My invention relates to an improvement in steam and hot water heating apparatus; and the objects of my invention are, first, to provide a simple and economical apparatus for the heating of a building or buildings by steam or hot water generated by means of a gas or liquid fuel; second, to economize in the use of fuel in heating a building by steam or by hot water; third, to provide a series of circular copper casings, with a series of circular copper tubes incased therein of high heating conductivity thereby greatly increasing the efficiency of the device.

In the substitution of a series of circular copper casings with a series of circular copper tubes incased therein, instead of the ordinary steel or cast iron tubing I have provided a new mode of operation which results in a new function, that is, rapid heating of the water within the boiler, and a greatly increased efficiency, and decided saving in the cost of operation, and by the use of copper casings and tubes I have introduced a superior material in place of an inferior material in the construction of a steam and hot water heating apparatus.

In the accompanying drawings:

Figure 1 is a plan view with the cover removed.

Figure 2 is a sectional elevation view on the line 2—2 of Figure 1.

Figure 3 is an enlarged view of one of the coils.

Referring to the drawings, my device consists of an outer cylindrical shell 1 which is provided with a cover 3, and the cover is fastened to the outer shell 1 in a steam tight manner by means of the bolts 17. The cover is also provided with a steam outlet 8. The shell 1 is secured to a base 5 by brazing or other suitable means, and the base is provided with a burner 6, with an inlet pipe 12, that is equipped to burn a gas or liquid fuel. By using a gas or liquid fuel I am able to obtain an intense heat that may be regulated by the burner to heat the water within the copper tubes 13 and 14 and the shell 1 to any desired degree of heat.

In my device I use a plurality of circular copper casings 4, with a water space 7 between each casing and the shell 1, and said circular casings are open at the bottom and fastened at the lower end 18 to the shell 1, and are connected to the said shell in a water and steam tight manner. The top of each copper casing is provided with a cover 16 which cover is also connected to the copper casing 4 in a steam and water tight manner, and each cover is provided with a fusible plug 11. Suspended within each copper casing, and connected to the copper casing in a steam and water tight manner by the connection 15, is a series of circular copper coils 13 and 14 concentrically disposed, and the upper and lower ends of the circular copper coils communicate with the interior of the shell 1. In the present embodiment of my invention I have shown but two coils 13 and 14 concentrically disposed, but two or more coils may be used and I do not care to limit myself to the exact description as shown in the drawing.

Each of the circular casings is provided with a gas or smoke outlet to carry away the gas or smoke from the burner 6, and consists of the flues 9, 10, 16, 19, and 20, which flues terminate in a large outlet flue 2, and are brazed or fastened by other means in a water and steam tight manner to the covers 16 and the large outlet flue 2.

It will readily be seen that by using a series of circular copper casings, with a series of circular copper coils incased therein, I have introduced into a steam boiler a means of high heating conductivity, and due to the particular relation of the copper casings within the shell 1 I have greatly increased the means to heat the water within the shell 1, and I have greatly increased the efficiency of a steam boiler by consuming the heat for the purpose of heating the water 7 within the shell 1, and also causing a very rapid circulation of water.

In operation my device is equipped with a water gauge, steam gauge, and other fixtures, which fixtures are not illustrated in the drawings.

It will be seen by referring to the drawings that each circular casing 4 is open at the bottom and acts as a combustion chamber. The circular coils 13 and 14 are concentrically disposed with an air space between them to facilitate the free passage of the heat between the layers of the coils.

What I claim is:

In a boiler, a vertical cylindrical shell closed at both ends, a plurality of spaced upright casings projecting upwardly within said shell, said casings being closed at the top and opening at the bottom through openings in the bottom of said shell, a plurality of concentric coils within each casing and connected to the boiler water space at opposite sides adjacent the top and bottom of said casing, a smoke box in the shell adjacent one side of the top thereof and an offtake flue from the top of each casing connected with said smoke box, said offtake flues being relatively restricted in cross sectional area with respect to said casings.

In testimony whereof I affix my signature.

JOSEPH H. D. BEAUCAGE.